FIP8407 OR X 2,705
[redacted]
BEST AVAILABLE COPY
J. Adamson.
Floating Dry Dock.
2705 X
Patented Dec. 13, 1816.
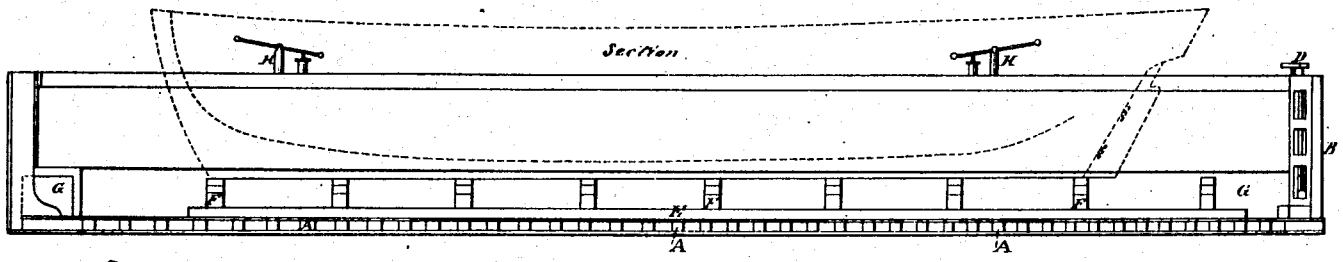
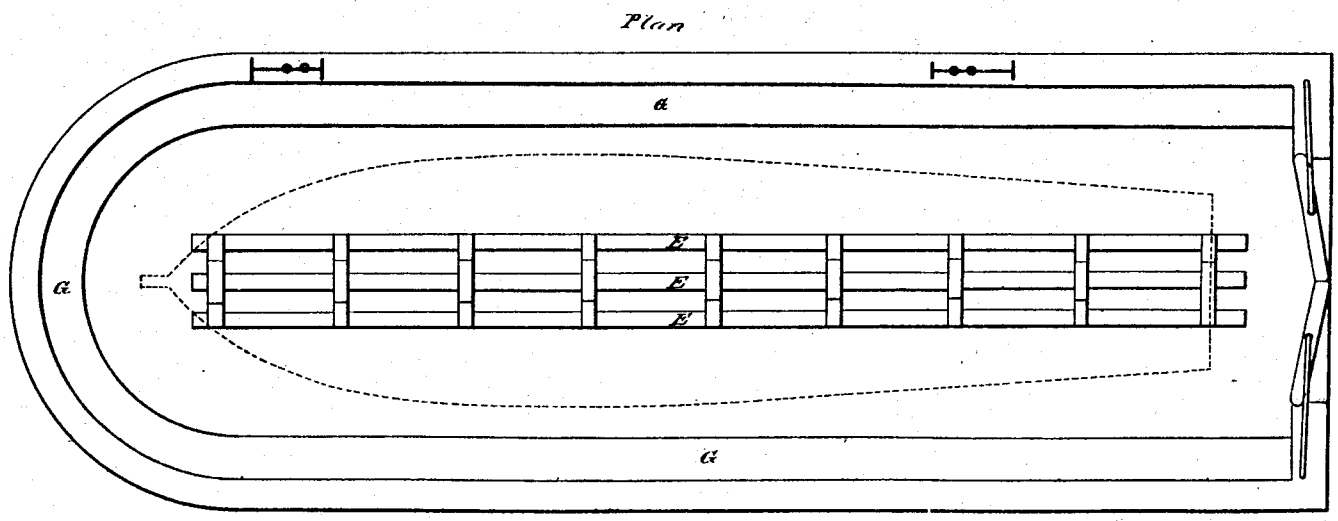
H. PETERS, PHOTO-LITHOGRAPHER, WASHINGTON, D. C.

United States Patent Office

PTO - BOYERS, PA Duty Station

MISSING PAGE TEMPORARY NOTICE

PATENT # X 2705 FOR ISSUE DATE 12-13-1816 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text bo 1-10-94

Data Conversion Operation

Boyers, Pa